United States Patent [19]

Whitmire et al.

[11] Patent Number: 4,912,169

[45] Date of Patent: Mar. 27, 1990

[54] ADHESIVE COMPOSITIONS CONTAINING LOW MOLECULAR WEIGHT POLYMER ADDITIVES

[75] Inventors: Judith L. Whitmire, Lederach; Patricia M. Lesko, Lansdale; Timothy G. Wood, North Wales, all of Pa.

[73] Assignee: Rohm and Haas Company, Philadelphia, Pa.

[21] Appl. No.: 344,506

[22] Filed: Apr. 27, 1989

Related U.S. Application Data

[63] Continuation of Ser. No. 108,854, Oct. 14, 1987, abandoned.

[51] Int. Cl.$^4$ .............................................. C08L 33/02
[52] U.S. Cl. ..................... 525/221; 525/208; 525/210; 525/216; 525/217; 525/219; 525/227; 525/228
[58] Field of Search ............... 526/317.1, 931; 525/221, 208, 210, 216, 217, 219, 227, 228

[56] References Cited

U.S. PATENT DOCUMENTS

| | | | |
|---|---|---|---|
| 3,867,481 | 2/1975 | Whang | 260/899 |
| 4,056,559 | 11/1977 | Lewis et al. | 526/212 |
| 4,185,050 | 1/1986 | Lazear et al. | 526/931 |
| 4,316,000 | 2/1982 | Boeder | 526/931 |

FOREIGN PATENT DOCUMENTS

| | | | |
|---|---|---|---|
| 3233840 | 3/1984 | Fed. Rep. of Germany | 526/317 |
| 8605503 | 9/1986 | Int'l Pat. Institute . | |
| 54-3136 | 1/1979 | Japan . | |
| 57-125277 | 8/1982 | Japan | 526/317 |
| 57-212279 | 12/1982 | Japan | 526/317 |
| 58-187468 | 11/1983 | Japan | 526/317 |
| 61-34084 | 2/1986 | Japan | 526/931 |
| 755064 | 7/1981 | U.S.S.R. | 526/317 |
| 1469682 | 4/1977 | United Kingdom . | |

OTHER PUBLICATIONS

"Patent Abstracts of Japan", vol. 3, No. 27 (C-39), Mar. 7, 1979.

*Primary Examiner*—C. Warren Ivy
*Assistant Examiner*—N. Sarofim

[57] ABSTRACT

Adhesive compositions containing a polymeric additive which is polymerized from monomers selected from $C_1-C_{20}$ alkyl and cycloalkyl acrylate, $C_1-C_{20}$ alkyl and cycloalkyl methacrylate, free-radical polymerizable olefinic acids, and optionally other ethylenically unsaturated monomers wherein said polymeric additive has a number average molecular weight less than about 35,000 and a softening point greater than about 40° C.

14 Claims, No Drawings

ADHESIVE COMPOSITIONS CONTAINING LOW MOLECULAR WEIGHT POLYMER ADDITIVES

This application is a continuation of application Ser. No. 108,854 filed Oct. 14, 1987, now abandoned.

BACKGROUND OF THE INVENTION

Traditionally, natural and synthetic rubbers have been used as pressure-sensitive adhesives, but these rubbers alone do not have the necessary balance of properties of peel strength, shear strength and tack. The rubber-based adhesives typically require the addition of tackifiers, such as rosin acid derivatives or aliphatic-/aromatic resins, to impart useful properties as pressure-sensitive adhesives.

Acrylic polymers have also found utility in pressure-sensitive adhesive applications. In most applications, these materials did not require compounding with tackifier resins. Recently, however, it has been shown that tackifiers provide a convenient and useful tool for modifying pressure-sensitive adhesives as discussed by T. G. Wood, "The Effects of Tackification on Waterborne Acrylic Pressure-Sensitive Adhesive", *Adhesive Age*, Vol. 30, pp. 19–23 (1987). A good discussion on pressure-sensitive adhesives can be found in *Handbook of Pressure-sensitive Adhesive Technology*, edited by Don Satas, Van Nostrand Reinhold Co., pp 353–369, (1982).

Japanese Patent Disclosure No. 54-3136 discloses a pressure-sensitive adhesive containing an acrylic polymer and a tackifier. The tackifier is prepared by solution polymerizing 25–75 weight % of vinyl aromatic compound and 75–25 weight % acrylic or methacrylic acid ester, and it has a number average molecular weight of 500–3,000 and a softening point of less than 40° C.

U.S. Pat. No. 3,867,481 discloses low molecular weight acrylic polymer containing (1) an alkyl methacrylate and (2) one or more additional acrylic methacrylic acid ester and/or a styrene for use as a processing modifier for rigid polyvinyl halide resins. U.S. Pat. No. 4,056,559 discloses low molecular weight polymers of alkyl methacrylates having an average chain length of about 6 to about 50 mers and having a variety of uses in films, coatings, adhesives and inks.

Applicants have discovered that pressure-sensitive adhesives can be improved by incorporating therein a polymeric additive having a softening point temperature greater than 40° C. The polymeric additives of applicants' invention result in an improved balance of adhesive properties including peel strength, shear resistance, and tack. Compared to adhesives blended with typical commercial tackifiers, the polymeric additives of this invention result in improved film clarity and ultra-violet (UV) stability.

SUMMARY OF THE INVENTION

This invention relates to improved adhesive compositions containing a polymeric additive. The polymeric additive is polymerized from monomers selected from $C_1$–$C_{20}$ alkyl and cycloalkyl acrylates, $C_1$–$C_{20}$ alkyl and cycloalkyl methacrylates, free-radical polymerizable olefinic acids, and optionally other ethylenically unsaturated monomers. The polymeric additive has a number average molecular weight less than about 35,000 and a softening point greater than about 40° C. The additive comprises from about 1 to about 55% of the adhesive composition on a dry weight basis and is preferably prepared by emulsion polymerization of monomers selected from isobutyl methacrylate, butyl methacrylate, isobornyl methacrylate, cyclohexyl methacrylate, ethyl methacrylate, methyl methacrylate, methacrylic acid, acrylic acid, styrene, alpha-methyl styrene and vinyl toluene. The adhesive composition preferably is a blend of a pressure-sensitive adhesive comprising polymers or copolymers of ethylene, vinyl acetate, acrylic acid or esters thereof or methacrylic acid or esters thereof with the polymeric additive of this invention.

DETAILED DESCRIPTION

Applicants have invented an improved adhesive composition containing relatively low molecular weight, high softening point polymer additives. Adhesive compositions containing these additives show an improved balance of properties in comparison to adhesive compositions containing no additive. In particular, the adhesive compositions of this invention exhibit an improved balance of tack, peel strength and shear resistance, without the problems in clarity and UV resistance caused when typical rosin or hydrocarbon tackifiers are used.

The polymeric additive of this invention is polymerized from monomers selected from $C_1$–$C_{20}$ alkyl and cycloalkyl acrylates, $C_1$–$C_{20}$ alkyl and cycloalkyl methacrylates, free-radical polymerizable olefinic acids, and optionally other ethylenically unsaturated monomers. Suitable alkyl and cycloalkyl acrylates include the various esters of acrylic acid such as methyl acrylate, ethyl acrylate, n-propyl acrylate, isopropyl acrylate, n-butyl acrylate, isobutyl acrylate, t-butyl acrylate, isobornyl acrylate, pentyl acrylate, hexyl acrylate, octyl acrylate, iso-octyl acrylate, nonyl acrylate, lauryl acrylate, stearyl acrylate, eicosyl acrylate, 2-ethylhexyl acrylate, cyclohexyl acrylate, cycloheptyl acrylate, and the like and mixtures thereof. Suitable alkyl and cycloalkyl methacrylate include the esters of methacrylic acid such as methyl methacrylate, ethyl methacrylate, propyl methacrylate, n-butyl methacrylate, t-butyl methacrylate, isobutyl methacrylate, pentyl methacrylate, hexyl methacrylate, cyclohexyl methacrylate, 2-ethylhexyl methacrylate, isobornyl methacrylate, heptyl methacrylate, cycloheptyl methacrylate, octyl methacrylate, iso-octyl methacrylate, nonyl methacrylate, decyl methacrylate, lauryl methacrylate, eicosyl methacrylate and the like and mixtures thereof. Suitable free-radical polymerizable olefinic acids include acrylic acid, methacrylic acid, fumaric acid, crotonic acid, itaconic acid, 2-acryloxypropionic acid, and the like and mixtures thereof. Various amounts of other ethylenically-unsaturated monomers can optionally be used provided that the polymeric additive has a softening point greater than about 40° C. and a number average molecular weight less than about 35,000. Optional ethylenically-unsaturated monomers suitable for use according to this invention include, for example, styrene, alpha-methyl styrene, vinyl toluene, acrylonitrile, methacrylonitrile, ethylene, vinyl acetate, vinyl chloride, vinylidene chloride, acrylamide, methacrylamide 2-cyanoethyl acrylate, 2-cyanoethyl methacrylate, dimethylaminoethyl methacrylate, dimethylaminopropyl methacrylate t-butylaminoethyl methacrylate, glycidyl acrylate, glycidyl methacrylate, benzyl acrylate, benzyl methacrylate, phenyl acrylate, phenyl methacrylate and the like.

The preferred monomers for preparing the polymeric additive are isobutyl methacrylate, butyl methacrylate, isobornyl methacrylate, cyclohexyl methacrylate, ethyl methacrylate, methyl methacrylate, methacrylic acid, and acrylic acid. More preferably the polymeric additive comprises by weight (a) about 90–100% isobutyl methacrylate and about 0–10% free-radical polymerizable olefinic acid or (b) about 45–90% butyl methacrylate about 10–55% isobornyl methacrylate and about 0–2% free-radical polymerizable olefinic acid. Most preferably the polymeric additive comprises by weight about 50–100% isobutyl methacrylate, about 0–50% methyl methacrylate, and about 0–10% free-radical polymerizable olefinic acid. The most preferred olefinic acid for use in this invention is methacrylic acid. Where stability to ultra-violet radiation is desired, it is preferred that the polymeric additive contain less than 25% by weight, more preferably none, vinyl aromatic monomers.

The polymeric additive of this invention can be prepared by any of the known polymerization processes such as emulsion, suspension, solution or bulk polymerization. It is preferred that the polymeric additive be prepared by emulsion polymerization using 1–20 mole percent of a chain transfer agent to achieve low molecular weight. Using emulsion polymerization to prepare polymeric additives of this invention provides advantages of better cost efficiency and mixability with water-based adhesive compositions. Suitable chain transfer agents for this polymerization include, for example, $C_1$–$C_{15}$ alkyl mercaptans, benzyl mercaptan, 3-mercaptoproprionic acid and esters thereof, mercaptoethanol, benzyl alcohol, alpha-methyl benzyl alcohol, and ethyl mercaptoacetate and the like.

The ability of a polymeric additive to improve the performance of adhesive compositions depends on its molecular weight, softening point (as determined by ASTM test method #E-2867) and the degree of compatibility between the additive and the adhesive polymer. Compatibility is a measure of the mutual solubility of two materials and compatible blends are characterized by (1) the existence of a single homogeneous phase which contains no discrete domains of either component and (2) a single glass transition temperature for the blend of components as discussed by P. B. Rim and E. B. Orler, "Dependence of Tg on Composition for a Compatible Polymer/Oligomer Blend", *Macromolecules*, Vol. 20, pp. 433–435 (1987). A lack of compatibility is generally evidenced by haziness in the dried film and a decrease in tack. Compatibility is typically favored between materials which are similar in composition and low in molecular weight. In order to effectively modify the performance of an adhesive, the polymeric additives of this invention should show an appreciable degree of compatibility with the adhesive polymer, although the two components need not be completely compatible.

It is desirable to optimize the balance of properties of an adhesive such as peel strength, shear strength, tack, and film clarity. All of these properties are important to adhesive compositions and the best advantages are achieved where the overall balance of these properties have been optimized. To achieve the necessary balance of adhesive properties, the polymeric additive of this invention must have a number average molecular weight less than about 35,000 and a softening point greater than about 40° C. Preferably the number average molecular weight of the polymeric additive is less than about 9,000, more preferably from about 600 to about 6000, most preferably from about 600 to about 4000.

The polymeric additive of this invention can be added to the adhesive compositions by any known technique, such as by mixing or blending, to uniformly incorporate the additive into the adhesive compositions. The additive is preferably added to the adhesive composition in the form of an aqueous emulsion or an emulsified solution in a combined aqueous/organic solvent medium. An effective amount of the polymeric additive typically ranges from about 1% to about 55% by weight based on the total dry weight of the adhesive composition.

The polymeric additive of this inventions can be used in a variety of adhesive compositions, including pressure sensitive adhesives. These adhesive compositions may contain rubbers such as isoprene and acrylonitrile-butadiene-styrene and polymers or copolymers prepared from styrene, butadiene, ethylene, vinyl acetate, acrylic acid or esters thereof, and methacrylic acid or esters thereof. Preferably the adhesive composition comprises (1) copolymers of ethylene and vinyl acetate or (2) polymers or copolymers prepared from acrylic or methacrylic acid or esters thereof.

The following examples are presented to further describe this invention. The examples are intended to be illustrative and not limitative. The molecular weight of the polymeric additive was determined by gel permeation chromatography using a Styragel Bead column and tetrahydrofuran as the solvent. The column was calibrated using poly(methyl methacrylate) of known molecular weight. The softening point was determined by the Ring-and-Ball method (ASTM #E-2867).

The following abbreviations are used in the Examples:

MMA = methyl methacrylate
BMA = butyl methacrylate
IBOMA = isobornyl methacrylate
IBMA = isobutyl methacrylate
STY = styrene
MAA = methacrylic acid
2EHA = 2-ethyl hexyl acrylate
EMA = ethyl methacrylate
n-DDM = n-dodecylmercaptan
APS = ammonium persulfate
SP = softening point
Mn = number average molecular weight

EXAMPLES I–XXI

Emulsion Polymerization

Polymeric additives within the scope of this invention were prepared by emulsion polymerization and had the compositions and physical properties given in Table I. The polymeric additives were prepared using the procedure below.

A 3-liter, 4-necked round bottom flask was charged with 610 grams water and ammonium persulfate (APS) at the levels (Initial Charge) given in Table I. A monomer emulsion feed composed of 280 grams water, 100 grams anionic sulfated surfactant, 1000 grams monomer and n-DDM (as given in Table I) was then added uniformly to the flask over 3 hours while maintaining 84° C. polymerization temperature. Simultaneously with the monomer emulsion feed, APS was added at the level (Feed) given in Table I in 45 grams water. Following the monomer addition the batch was held at 84° C. for 30 minutes, then cooled to 70° C. and 1 gram 28% aqueous ammonia was added. The batch was further cooled to room temperature, filtered, and the polymeric product recovered.

TABLE I

| Example | Monomer Composition (wt. %) | | | | | | | n-DDM* | APS* Initial Charge | Feed | SP | Mn |
| --- | --- | --- | --- | --- | --- | --- | --- | --- | --- | --- | --- | --- |
| | MMA | BMA | IBMA | IBOMA | STY | EMA | MAA | | | | | |
| I | | 99.5 | | | | | 0.5 | 5.0 | 1.5 | 0.5 | 60° C. | 2310 |
| II | | | 99.5 | | | | 0.5 | 7.0 | 1.5 | 0.5 | 83° C. | 2370 |
| III | | | 39.8 | | 59.7 | | 0.5 | 7.5 | 1.5 | 0.5 | 81° C. | 2320 |
| IV | 24.6 | 74.9 | | | | | 0.5 | 7.5 | 0.13 | 0.07 | 100° C. | 2810 |
| V | | | | | | 99.5 | 0.5 | 7.5 | 0.13 | 0.07 | 96° C. | 20 |
| VI | 1.0 | | 98.5 | | | | 0.6 | 7.5 | 1.5 | 0.5 | 89° C. | 1820 |
| VII | | 69.7 | | 29.8 | | | 0.5 | 5.0 | 1.5 | 0.5 | 87° C. | 3340 |
| VIII | | 49.8 | | 49.8 | | | 0.5 | 5.0 | 1.5 | 0.5 | 109° C. | 2990 |
| IX | | 49.8 | 49.8 | | | | 0.5 | 5.0 | 1.5 | 0.5 | 127° C. | 2670 |
| X | | 89.6 | 9.9 | | | | 0.5 | 5.0 | 1.5 | 0.5 | 104° C. | 1370 |
| XI | 95 | | | | | | 5.0 | 5.0 | 1.5 | 0.5 | 75° C. | 3320 |
| XII | 90 | | | | | | 10.0 | 5.0 | 1.5 | 0.5 | 91° C. | 3280 |
| XIII | 99.5 | | | | | | 0.5 | 3.0 | 1.5 | 0.5 | 82° C. | 7430 |
| XIV | | | 19.9 | 79.6 | | | 0.5 | 20.0 | 0.13 | 0.07 | 57° C. | 950 |
| XV | | | 49.75 | 49.75 | | | 0.5 | 20.0 | 0.13 | 0.07 | 47° C. | 1070 |
| XVI | 99.5 | | | | | | 0.5 | 6.0 | 1.5 | 0.5 | 64° C. | 0 |
| XVII | | 99.5 | | | | | 0.5 | 7.5 | 0.13 | 0.07 | 89° C. | 2750 |
| XVIII | | 99.5 | | | | | 0.5 | 15.0 | 0.13 | 0.07 | 54° C. | 1700 |
| XIX | | 99.5 | | | | | 0.5 | 3.0 | 0.13 | 0.07 | 106° C. | 8600 |
| XX | | 99.5 | | | | | 0.5 | 0.25 | 0.13 | 0.07 | >125° C. | 28,100 |
| XXI | | 99.5 | | | | | 0.5 | 0.00 | 0.13 | 0.07 | >125° C. | 34,800 |

*weight percent based on 100 grams of monomer

EXAMPLE XXII–XXIII

Comparative

Following the procedure for Examples I–XXI, polymeric additives falling outside the scope of this invention (i.e. having a softening point less than 40° C.) were prepared for comparative purposes. The compositions and physical properties are given in Table II.

TABLE II

| Example | Monomer Composition (wt. %) | | | n-DDM* | APS* Initial Charge | Feed | SP | Mn |
| --- | --- | --- | --- | --- | --- | --- | --- | --- |
| | MAA | EA | BA | | | | | |
| XXII | 0.5 | 99.5 | | 10.0 | 0.13 | 0.07 | <25° C. | 1790 |
| XXIII | 0.5 | | 99.5 | 10.0 | 1.5 | 0.5 | <25° C. | 1900 |

*wt. % based on 100 grams of monomer

EXAMPLES XXIV–XXV

Comparative

Solution polymerization reactions were carried out as described in Japanese patent Disclosure No. 54-3136 to prepare polymers for comparison purposes. The polymerizations were carried out using a 1.5 hour gradual addition at 170° C. with para-cymene as the solvent. The initiator was di-tert-butyl peroxide at a level of 1 weight % based on total monomer. The compositions and physical properties of the polymers are given in Table III.

TABLE III

| Example | Composition (wt %) | | | SP | MN |
| --- | --- | --- | --- | --- | --- |
| | 2EHA | BA | STY | | |
| XXIV | 50 | | 50 | <25° C. | 1310 |
| XXV | | 50 | 50 | <25° C. | 1260 |

EXAMPLE XXVI

Solution Polymerization

A polymeric additive falling within the scope of this invention was prepared by solution polymerization according to the following procedure.

A 2-liter, 4-necked flask was heated and sparged with nitrogen. A monomer mixture was prepared using 800 grams of methyl methacrylate and 200 grams of toluene. A catalyst consisting of 19.7 grams of potassium methoxide (30% in methanol) and 100 grams of the monomer mixture were added to the flask. The flask was heated to 65° C. and a gradual addition of 20% of the monomer mixture was started. At the end of that addition the temperature was maintained at 65° C. for about 30 minutes. The remaining monomer mixture was then gradually added over 1.5 hours and the temperature was maintained at 65° C. for 30 minutes. The final polymeric additive had a softening point of 50° C. and a Mn of 600.

EXAMPLE XXVII

Solution Polymerization

Following the procedure of Example XXVI, a polymeric additive within the scope of this invention was prepared, except that 400 grams of butyl methacrylate and 400 grams of isobornyl methacrylate were used in the monomer mixture. The final polymeric additive had a softening point of 63° C. and a Mn of 1290.

EXAMPLE XXVIII

Adhesion Testing

Polymeric additives prepared in the preceding examples were tested for adhesion properties in a butyl acrylate-based emulsion adhesive. The emulsion-polymerized polymeric additives were treated with a 28% aqueous ammonium hydroxide solution to a pH of 9. The solution-polymerized additives were emulsified with deionized water and surfactants. Each of the above emulsions were then blended at various levels with the acrylic emulsion adhesive and the pH adjusted to 9 by addition of ammonium hydroxide solution. The adhesive-additive blends were then coated on acetone-wiped polyethylene terephthalate sheet and dried at 105° C.

tives of Examples XXII and XXIII having lower softening points.

TABLE IV

| Samples | Amount of Additive (parts by weight)* | Film Clarity | Peel Strength (oz./in.) | Shear Resistance (hours) ($\frac{1}{2}$ in$^2$, 1 kg) | Loop Tack (oz.) |
| --- | --- | --- | --- | --- | --- |
| 1. Ex. I | 0 | E | 28 | 5.5 | 33 |
|  | 10 | E | 46 | 2.1 | 28 |
|  | 20 | E | 48 | 1.6 | 30 |
| 2. Ex. II | 0 | E | 28 | 1.9 | 26 |
|  | 10 | E | 33 | 1.3 | 25 |
|  | 20 | E | 39 | 1.3 | 27 |
| 3. Ex. III | 0 | E | 27 | 7.1 | 31 |
|  | 10 | E | 34 | 4.5 | 30 |
|  | 20 | E | 42 | 3.4 | 36 |
| 4. Ex. V | 0 | E | 32 | 4.0 | 28 |
|  | 10 | E | 34 | 6.0 | 28 |
|  | 20 | E | 39 | 3.0 | 28 |
| 5. Ex. VII | 0 | E | 28 | 5.5 | 33 |
|  | 10 | E | 46 | 3.6 | 23 |
|  | 20 | VG | 56 | 5.2 | 2 |
| 6. Ex. XIV | 0 | E | 30 | 5.9 | 31 |
|  | 10 | E | 35 | 3.0 | 40 |
|  | 20 | E | 43 | 2.0 | 52 |
| 7. Ex. XXII (Comparative) | 0 | E | 31 | 11.5 | 32 |
|  | 10 | E | 31 | 0.9 | 41 |
|  | 20 | E | 23 | 0.4 | 42 |
| 8. Ex. XXIII (Comparative) | 0 | E | 28 | 4.2 | 34 |
|  | 10 | E | 25 | 0.8 | 30 |
|  | 20 | E | 14 | 0.6 | 28 |

*based on 100 parts by weight of total composition.

for 5 minutes (or, where indicated, on untreated, biaxially-oriented polypropylene and dried at 70° C. for 15 min.). The thickness of the dried adhesive films was 0.001 inches. The coated sheets were then laminated to an untreated polypropylene cover sheet. The laminates were cut into 1-inch wide strips and conditioned for at least 24 hours at 25° C. and 50% relative humidity prior to testing.

The laminate samples were visually inspected for clarity and rated according to the following scale:
E = excellent film quality with complete clarity
VG = very good film quality with very slight haziness
G = good film quality with slight haziness
F = fair film quality with moderate haziness
P = poor film quality with severe haziness
Peel strengths were determined according to Pressure Sensitive Tape Council Method No. 1 using a 1-minute dwell time. Shear resistances were measured using Pressure Sensitive Tape Council Method No. 7 using $\frac{1}{2} \times 1$ inch overlap areas and 1000 gram weights. Tack was measured using Tag and Label Manufacturer's Institute Loop Tack Tester. The results are presented in Table IV and show that the polymeric additives of this invention (i.e. softening point >40° C.) show an improved balance of peel strength, shear resistance and tack when compared to the polymeric addi-

EXAMPLE XXIX

Adhesion Testing

Polymers prepared in Examples XXIV and XXV according to Japanese Patent Disclosure No. 54-3136 were blended at varying levels with the butyl acrylate-based latex emulsion used in Ex. XXVIII and tested for adhesive performance in comparison to a typical polymeric additive (Ex. IV) within the scope of this invention. The results are given in Table V.

The results show that the polymeric additive of the present invention (having a softening point of 100° C.) gives a better overall balance of adhesion properties. Ex. IV had dramatically improved shear resistance, better film clarity and peel strength and similar loop tack Examples XXIV and XXV (having softening points <25° C.).

TABLE V

| Samples | Amount of Additive (parts by weight)* | Film Clarity | Peel Strength (oz./in.) | Shear Resistance (hours) ($\frac{1}{2}$ in.$^2$ 1 kg) | Loop Tack (oz.) |
| --- | --- | --- | --- | --- | --- |
| Ex. IV | 0 | E | 32 | 1.5 | 35 |
|  | 20 | E | 45 | 5.5 | 39 |
| Ex. XXIV (Comparative) | 0 | E | 32 | 1.5 | 35 |
|  | 20 | F | 38 | 0.4 | 42 |
| Ex. XXV (Comparative) | 0 | E | 32 | 1.5 | 35 |
|  | 20 | F | 39 | 0.4 | 42 |

*based on 100 parts by weight of total composition

EXAMPLE XXX

Adhesion Testing

Polymeric additives within the scope of this invention, prepared in Examples XV and XXVII, were blended at various levels with the acrylic emulsion used in Ex. XXVIII and tested for adhesive performance. The results are given in Table VI and show that relatively high levels (i.e. 40%) of polymeric additive can be used if the molecular weight of the additive is sufficiently low. The higher levels of these very low molecular weight additives result in dramatic improvements in tack and peel strength.

TABLE VI

| Samples | Amount of Additive (parts by weight)* | Film Clarity | Peel Strength (oz./in.) | Shear Resistance (hours) ($\frac{1}{2}$ in.$^2$ 1 kg) | Loop Tack (oz.) |
|---|---|---|---|---|---|
| 1. Ex. XV | 0 | E | 30 | 5.9 | 31 |
| (Mn = 1070) | 10 | E | 36 | 2.9 | 38 |
|  | 20 | E | 40 | 1.8 | 41 |
|  | 30 | E | 48 | 0.8 | 42 |
|  | 40 | VG | 51 | 0.3 | 45 |
| 2. Ex. XXVII** | 0 | E | 24 | 4.2 | 36 |
| (Mn = 1290) | 15 | VG | 33 | 2.3 | 54 |
|  | 25 | VG | 45 | 2.2 | 52 |
|  | 40 | VG | 71 | 2.6 | 68 |
| 3. Ex. XIX | 0 | E | 25 | 9.0 | 28 |
| (Mn = 8600) | 2.5 | E | 27 | 8.0 | 28 |
|  | 5 | E | 30 | 7.0 | 29 |
|  | 10 | E | 48 | 6.0 | 24 |
|  | 20 | E | 43 | 7.0 | 30 |
| 4. Ex. XX | 0 | E | 26 | 1.2 | 23 |
| (Mn = 28,100) | 2.5 | E | 27 | 1.5 | 23 |
|  | 5 | E | 28 | 2.2 | 20 |
|  | 10 | E | 26 | 4.9 | 13 |
|  | 20 | E | 20 | >25 | 2 |
| 5. Ex XXI | 0 | E | 26 | 3.5 | 31 |
| (Mn = 34,800) | 2.5 | E | 26 | 4.7 | 25 |
|  | 5 | E | 26 | 11.7 | 26 |
|  | 10 | VG | 27 | >25 | 21 |
|  | 20 | G | 22 | >25 | 8 |

*based on 100 parts by weight of total composition
**coated on untreated biaxially oriented polypropylene

We claim:

1. An adhesive composition containing a blend of (i) adhesive polymers or copolymers prepared from monomers selected from the group consisting of styrene, butadiene, acrylonitrile, ethylene, vinyl acetate, acrylic acid, esters of acrylic acid, methacrylic acid and esters of methacrylic acid and (ii) from about 1 to about 55% on a dry weight basis of a polymeric additive wherein said polymeric additive is polymerized from monomers selected from the group consisting of $C_1$-$C_{20}$ alkyl and cycloalkyl acrylates, $C_1$-$C_{20}$ alkyl and cycloalkyl methacrylates, free-radical polymerizable olefinic acids, and other ethylenically unsaturated monomers selected from the group consisting of styrene, alpha-methyl styrene, vinyl toluene, acrylonitrile, methacrylonitrile, ethylene, vinyl acetate, vinyl chloride, vinylidene chloride, acrylamide, methacrylamide, 2-cyanoethyl acrylate, 2-cyanoethyl methacrylate, dimethylaminoethyl methacrylate, dimethylaminopropyl methacrylate, t-butylaminoethyl methacrylate, glycidyl acrylate, glycidyl methacrylate, benzyl acrylate, benzyl methacrylate, phenyl acrylate and phenyl methacrylate, said polymeric additive having a number average molecular weight less than about 35,000 and a softening point greater than about 40° C.

2. A composition of claim 1 wherein said polymeric additive has a number average molecular weight less than about 9000.

3. A composition of claim 1 wherein said polymeric additive has a number average molecular weight from about 600 to about 6000.

4. A composition of claim 1 wherein said polymeric additive has a number average molecular weight from about 600 to about 4000.

5. A composition of claim 1 wherein said polymeric additive is polymerized from monomers selected from isobutyl methacrylate, butyl methacrylate, isobornyl methacrylate, cyclohexyl methacrylate, ethyl methacrylate, methyl methacrylate, methacrylic acid, and acrylic acid.

6. A composition of claim 6 wherein said adhesive composition comprises copolymers of ethylene and vinyl acetate.

7. A composition of claim 1 wherein said polymeric additive is prepared by emulsion polymerization.

8. A composition of claim 1 wherein the amount of said polymer additive ranges from about 1 to about 55% by weight based on the total dry weight of said adhesive composition.

9. A composition of claim 1 wherein said polymeric additive comprises by weight about 90-100% isobutyl methacrylate and about 0-10% free-radical polymerizable olefinic acid.

10. A composition of claim 9 wherein said olefinic acid is methacrylic acid.

11. A composition of claim 1 wherein said polymeric additive comprises by weight about 45-90% butyl methacrylate, about 10-55% isobornyl methacrylate and about 0-2% free-radical polymerizable olefinic acid.

12. A composition of claim 11 wherein said olefinic acid is methacrylic acid.

13. A composition of claim 1 wherein said polymeric additive comprises by weight about 50-100% isobutyl methacrylate, about 0-5% methyl methacrylate, and about 0-10% free-radical polymerizable olefinic acid.

14. A composition of claim 12 wherein said olefinic acid is methacrylic acid.

* * * * *